(12) United States Patent
Roach et al.

(10) Patent No.: US 10,337,408 B2
(45) Date of Patent: Jul. 2, 2019

(54) THERMAL INSULATION BLANKET AND THERMAL INSULATION BLANKET ASSEMBLY

(71) Applicant: MRA Systems, LLC, Baltimore, MD (US)

(72) Inventors: Andrew Michael Roach, Aberdeen, MD (US); David Patrick Calder, Baltimore, MD (US); Graham Frank Howarth, Middletown, DE (US)

(73) Assignee: MRA Systems, LLC, Baltimore, MD (US)

( * ) Notice: Subject to any disclaimer, the term of this patent is extended or adjusted under 35 U.S.C. 154(b) by 344 days.

(21) Appl. No.: 15/176,513

(22) Filed: Jun. 8, 2016

(65) Prior Publication Data

US 2017/0356343 A1    Dec. 14, 2017

(51) Int. Cl.
| | |
|---|---|
| F02C 7/12 | (2006.01) |
| B64D 27/10 | (2006.01) |
| B64D 29/00 | (2006.01) |
| F01D 25/14 | (2006.01) |
| F02C 7/24 | (2006.01) |
| B64C 1/40 | (2006.01) |
| F16L 59/00 | (2006.01) |

(52) U.S. Cl.
CPC .............. *F02C 7/24* (2013.01); *B64C 1/40* (2013.01); *B64D 27/10* (2013.01); *B64D 29/00* (2013.01); *F01D 25/145* (2013.01); *F16L 59/00* (2013.01); *Y02T 50/46* (2013.01); *Y02T 50/672* (2013.01); *Y02T 50/675* (2013.01)

(58) Field of Classification Search
CPC .......... F01D 25/145; F02C 7/24; F16L 59/00; B64D 27/10; B64D 29/00; B64C 1/40; Y02T 50/46; Y02T 50/672; Y02T 50/675
See application file for complete search history.

(56) References Cited

U.S. PATENT DOCUMENTS

| | | | | |
|---|---|---|---|---|
| 4,522,673 A | * | 6/1985 | Fell ........................... | B32B 5/26 156/307.3 |
| 7,238,311 B2 | | 7/2007 | Ristic-Lehmann et al. | |
| 8,333,558 B2 | * | 12/2012 | Finn ...................... | F01D 21/045 415/173.1 |

(Continued)

FOREIGN PATENT DOCUMENTS

| | | |
|---|---|---|
| CN | 101405422 A | 4/2009 |
| CN | 102465719 A | 5/2012 |

(Continued)

OTHER PUBLICATIONS

Extended European Search Report and Opinion issued in connection with corresponding EP Application No. 17174339.6 dated Sep. 29, 2017.

(Continued)

*Primary Examiner* — Igor Kershteyn
(74) *Attorney, Agent, or Firm* — McGarry Bair PC

(57) ABSTRACT

A thermal insulation blanket assembly having a thermal insulation blanket including an aerogel insulation material having a first surface and a second surface that is oppositely-disposed from the first surface, a backing covering the second surface of the aerogel insulation material, and a skin layer covering the first surface of the aerogel insulation material.

18 Claims, 4 Drawing Sheets

(56) References Cited

U.S. PATENT DOCUMENTS

| | | | |
|---|---|---|---|
| 8,734,931 B2 | 5/2014 | Seth et al. | |
| 9,109,088 B2 | 8/2015 | Meador et al. | |
| 2005/0208851 A1* | 9/2005 | Gooliak | B32B 5/02 |
| | | | 442/59 |
| 2006/0046598 A1 | 3/2006 | Shah | |
| 2006/0248854 A1 | 11/2006 | Bartley-Cho et al. | |
| 2007/0154698 A1 | 7/2007 | Stepanian | |
| 2007/0215326 A1* | 9/2007 | Schwarz | F01D 5/046 |
| | | | 165/96 |
| 2007/0238008 A1 | 10/2007 | Hogan et al. | |
| 2008/0112796 A1* | 5/2008 | Coney | F02K 1/386 |
| | | | 415/115 |
| 2010/0194179 A1* | 8/2010 | Waltz | B60T 5/00 |
| | | | 301/6.91 |
| 2012/0082808 A1 | 4/2012 | Lemains et al. | |
| 2012/0308369 A1 | 12/2012 | Maheshwari et al. | |
| 2013/0196137 A1 | 8/2013 | Evans et al. | |
| 2014/0255642 A1 | 9/2014 | White et al. | |
| 2014/0273701 A1 | 9/2014 | Samanta et al. | |
| 2014/0287641 A1 | 9/2014 | Steiner, III | |
| 2015/0165736 A1 | 6/2015 | Sattayatam et al. | |
| 2015/0175272 A1 | 6/2015 | Brochard et al. | |

FOREIGN PATENT DOCUMENTS

| | | |
|---|---|---|
| CN | 103047013 A | 4/2013 |
| DE | 20 2007 008842 U1 | 9/2007 |
| DE | 202007008842 U1 | 9/2007 |
| JP | H10-510888 A | 10/1998 |
| JP | 2008-149712 A | 7/2008 |
| WO | 2013/065285 A1 | 5/2013 |

OTHER PUBLICATIONS

Machine Translation and Notification of Reasons for Refusal issued in connection with corresponding JP Application No. 2017-108890 dated Jul. 3, 2018.

First Office Action and Search issued in connection with corresponding CN Application No. 201710428134.7 dated Nov. 21, 2018 (English Translation Not Available), 7 pages.

\* cited by examiner

THERMAL INSULATION BLANKET AND THERMAL INSULATION BLANKET ASSEMBLY

BACKGROUND OF THE INVENTION

Turbine and turbofan engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbofan and turbine engines are used for propulsion of the aircraft. In terrestrial applications, turbine engines are often used for power generation and marine propulsion. The engines are typically mounted in an enclosure or housing such as an aerodynamic fairing or nacelle. In some configurations, the aerodynamic fairing or nacelle can be integrated into the aircraft airframe.

Thermal insulation blankets can be utilized for surrounding the core of the engine. Thermal insulation blankets can also be utilized to protect the enclosure, nacelle, or engine mounted accessories or controls from normal or elevated engine temperatures. Conventionally such blankets can be composed of high temperature insulating materials wrapped in a thin sheet metal skin which provides insulation retention, operational durability, and structural rigidity.

BRIEF DESCRIPTION OF THE INVENTION

In one aspect of the present disclosure, a thermal insulation cover includes an aerogel insulation material having a first surface and a second surface that is oppositely-disposed from the first surface, a backing covering the second surface of the aerogel insulation material, and a skin layer covering the first surface of the aerogel insulation material and wrapping around an end of the aerogel insulation material and a portion of the backing and a portion of the second surface.

According to a second aspect of the present disclosure, a thermal insulation blanket assembly covering at least a portion of a core engine of a gas turbine engine, includes a thermal insulation blanket having a layered construction, including an aerogel insulation material having a first surface and a second surface that is oppositely-disposed from the first surface, a backing covering the second surface of the aerogel insulation material, a skin layer covering the first surface of the aerogel insulation material and wrapping around an end of the aerogel insulation material, a portion of the backing, and a portion of the second surface, and a fastener integrated into the blanket and configured to operably fasten to a cowl of the core engine.

According to a third aspect of present disclosure, a thermal insulation blanket assembly for a gas turbine engine, includes a thermal insulation blanket, comprising an aerogel insulation material having oppositely-disposed first and second surfaces, a metal skin layer covering the first surface of the aerogel insulation material and wrapping around an end to cover an edge of the second surface, and an integrated fastener configured to mate with a structure on a cowl of the gas turbine engine, and wherein the thermal insulation blanket has a thickness ranging from 1.2 mm to 7.5 mm.

DETAILED DESCRIPTION OF THE INVENTION

Figure 1:
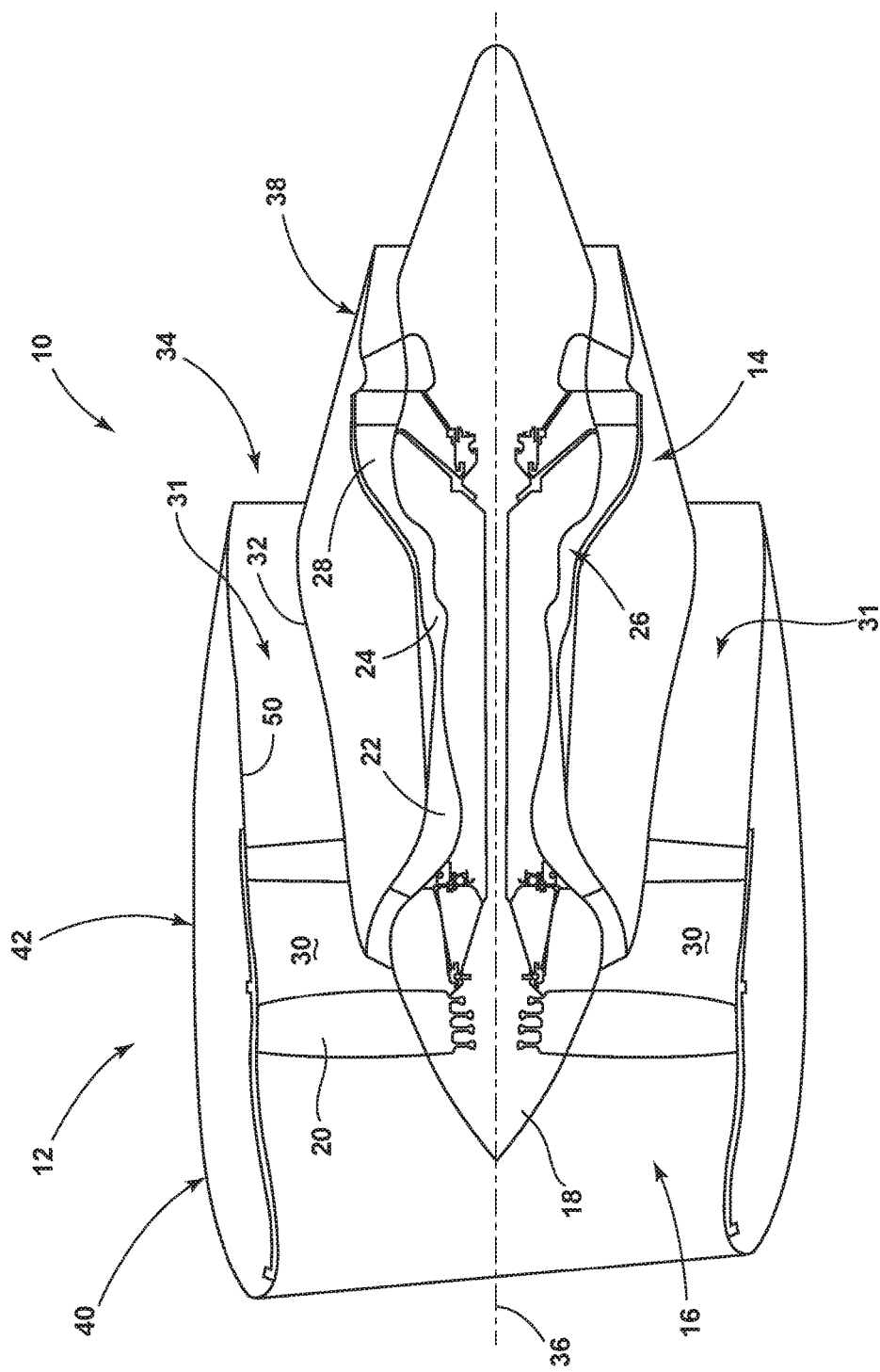
FIG. 1 is a schematic cross-sectional diagram of a gas turbine engine in accordance with the present disclosure.

The described aspects of the present disclosure are directed to insulative blanket, particularly for use in a gas turbine engine. For purposes of illustration, the present disclosure will be described with respect to an aircraft gas turbine engine. It will be understood, however, that the present disclosure is not so limited and can have general applicability in non-aircraft applications, such as other mobile applications including but not limited to, space, automotive, rail, and marine, and non-mobile industrial, commercial, and residential applications. While aspects of the disclosure are directed to an insulative blanket, aspects of the disclosure can be applied to additional insulative structures or materials including, but not limited to, covers, mats, shrouds, and the like.

As used herein, the term "forward" or "upstream" refers to moving in a direction toward the engine inlet, or a component being relatively closer to the engine inlet as compared to another component. The term "aft" or "downstream" refers to a direction toward the rear or outlet of the engine relative to the engine centerline. Additionally, as used herein, the terms "radial" or "radially" refer to a dimension extending between a center longitudinal axis of the engine and an outer engine circumference. It should be further understood that "a set" can include any number of the respectively described elements, including only one element.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the present disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 schematically represents a gas turbine or turbofan engine 10 including a nacelle 12 surrounding at least a portion of a core engine 14. The gas turbine engine 10 has a generally longitudinal extending axis or centerline 36 extending forward to aft. A fan assembly 16 located in front of the core engine 14 includes a spinner nose 18 projecting forwardly from an array of fan blades 20. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the gas turbine engine 10 to generate additional engine thrust. The bypassed air passes through an annular-shaped bypass duct 30 defining a fore-to-aft airflow conduit or airflow conduit 31 between the nacelle 12 and an inner core cowl 32, and exits the bypass duct 30 through a fan exit nozzle 34. The inner core cowl 32 defines the radially inward boundary of the bypass duct 30, and provides a transition surface to a primary exhaust nozzle 38 that extends aft from the core engine 14. The nacelle 12 defines the radially outward boundary of the bypass duct 30. The bypassed fan airflows through the airflow conduit 31 before being exhausted through the fan exit nozzle 34. The nacelle 12 can include several primary elements that define the external boundaries of the nacelle 12 including, but not limited to, an inlet assembly 40, a fan cowl 42 interfacing with an engine fan case that surrounds the fan blades 20.

The inner core cowl 32 provides, among other things, aerodynamic contour for the airflow through the bypass duct 30, acoustic suppression, and engine systems failure containment. Typically, the inner core cowl 32 is manufactured from aluminum bonded or graphite composite panels utilizing epoxy or bismaleimide resins to provide strength and structural integrity. These cured resins and hence the structural panels they are integral to are capable of maintaining structural properties up to the 250° F. to 450° F. temperature range. However, in an aircraft engine nacelle and potentially other engine, generator or auxiliary power initial installations it is probable that leaking or failed engine secondary ducts, auxiliary ducts or accessory attachment flanges can result in compartment temperatures in excess of 600° F. for extended periods of time. This would damage or degrade the structural components unless they are protected.

Figure 2:
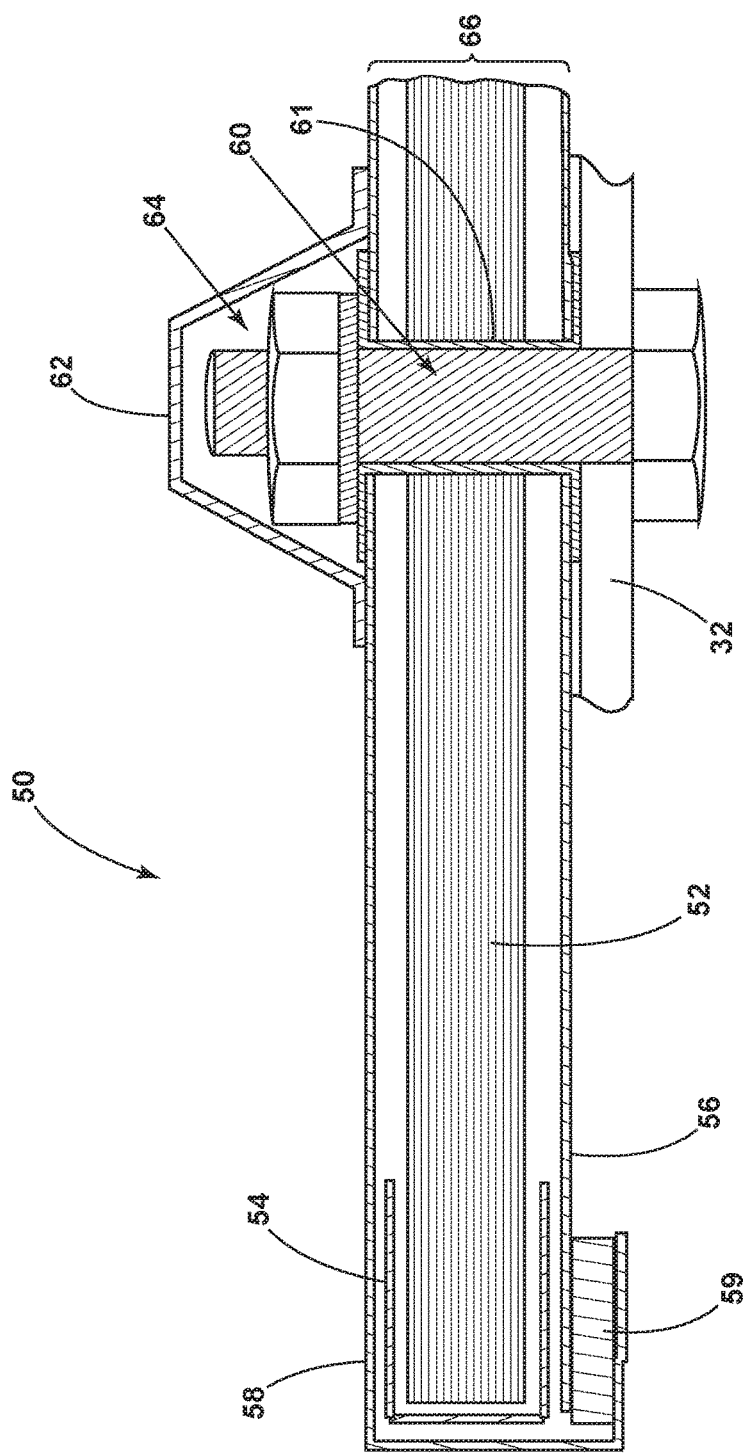
FIG. 2 is a cross-sectional view of a prior art blanket attached to a cowl of a gas turbine engine.

Traditionally aircraft nacelle components have been protected from the hot aircraft engine environment by spray on insulation materials or mechanically attached insulation blankets. FIG. 2 is a representation of a blanket according to the prior art used in core cowls of high bypass gas turbine engines, as well as other aircraft engine nacelle components, for example, engine inlets, thrust reversers and transcowls. Contemporary materials and constructions for the prior art thermal insulation blanket 50 include an insulation material 52, for example, a glass or ceramic fiber insulation material surrounded by an insulation edge seal 54. It will be understood that gaps are shown in the prior art thermal insulation blanket 50 for clarity. A first barrier 56 such as fiberglass or other material can be located on the side adjacent the cowl. A thin layer of steel 58 can be located on the opposite face and can be wrapped around to form an edge closeout. An adhesive 59 can be utilized to attach the thin layer of steel 58 to the first barrier 56.

Such a prior art thermal insulation blanket 50 has been attached using many conventional metallic fasteners 60, which typically pass thru the prior art thermal insulation blanket 50 such as through an included metallic grommet 61. Such conventional metallic fasteners 60 extend through the prior art thermal insulation blanket 50 and thus also need to be protected. Typically an insulative cap 62, which is illustrated over a head 64 or nut of the conventional metallic fastener 60, is included over each of the conventional metallic fasteners 60.

As operating temperatures have increased with newer engine designs, the increasingly severe thermal environments of their core cowls have necessitated thicker and heavier insulation blankets 50, which are disadvantageous in terms of weight, which negatively affects fuel economy, clearance with surrounding components of the core engine, and maintenance performed on the core engine. Such a prior art thermal insulation blanket 50 has an overall thickness 66 greater than 6 mm (0.24 inches) and typically ranges from up to 19.0 mm (0.75 inches). Contemporary insulation blanket technology such as that illustrated in FIG. 2, uses glass or silica fiber matting as the insulation material and utilizes conventional metallic thru fasteners in steel or titanium with insulative caps for attachments. Further, the installed weight of the conventional prior art thermal insulation blanket 50 falls between 4.88 kilograms per square meter and 2.93 kilograms per square meter (0.6 and 1.0 pounds per square foot) resulting in a total of as much as 81.65 kilograms (180 pounds) per nacelle thrust reverser depending on cowl geometry and can require 300 to 500 conventional metallic fasteners 60 with associated cost, complexity, weight and impact on cowl structure. The thickness of the conventional thermal blanket and the projection of the conventional metallic fasteners 60 reduces available space for engine and accessory packaging and drives nacelle lines larger increasing drag.

As such, there is a desire for thinner thermal insulation blankets that are capable of achieving comparable or lower thermal conductivities, while also reducing weight in order to improve the efficiency of the blanket and the overall efficiency of the engine in which it is installed. The continued search for improved aircraft and engine performance requires all elements of the construction to achieve lower weight and also, in the case of engine nacelles, reduced thickness to optimize engine installation and reduce overall size and resulting aerodynamic drag. Aspects of the disclosure relate to a protective insulating blanket or shield utilizing polyimide aerogel, also referred to as aerogel, as the insulative and protection medium. As used herein, "aerogel" or "polyimide aerogel" can include aerogel materials configured, selected, or enabled to withstand the operating environment of the application, such as in a gas turbine engine. In this sense, the aerogel materials can be configured, selected, or enabled to include a durability capable of withstanding external factors including, but not limited to, repeated physical handling, repeated vibration, repeated load application, and the like, without breaking down, becoming destroyed, or losing the insulative or protective qualities of the aerogel.

Figure 3:
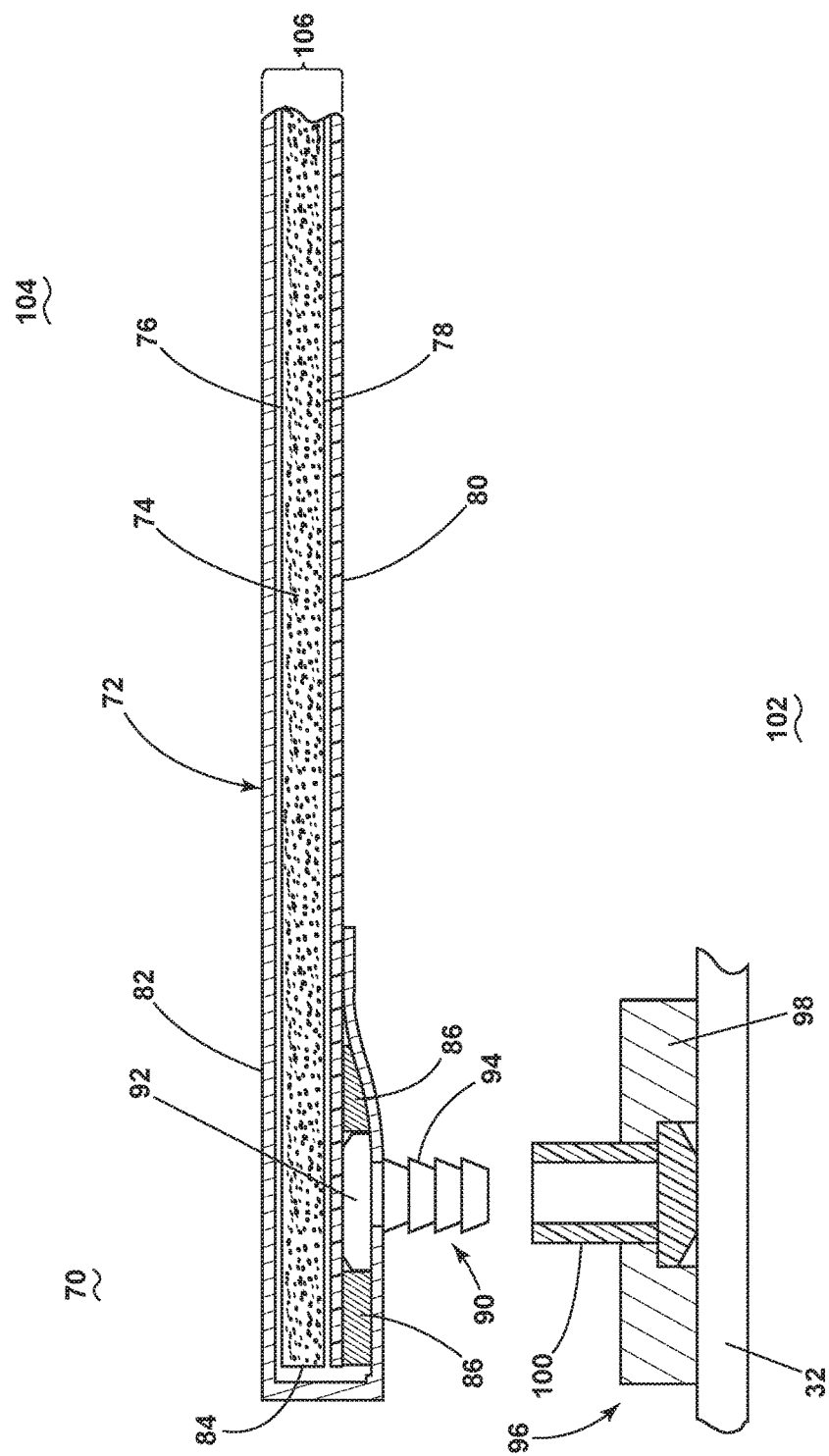
FIG. 3 is a cross-sectional view of a blanket separate from a portion of the assembly according to the present disclosure, which can be utilized in the gas turbine engine of FIG. 1.

For example, FIG. 3 illustrates an exemplary thermal insulation blanket assembly 70 according to aspects of the disclosure. Such a thermal insulation blanket assembly 70 can be utilized to surround a portion of a core engine of a gas turbine engine such as the gas turbine engine and core illustrated in FIG. 1. A thermal insulation blanket 72 is included in the thermal insulation blanket assembly 70 and includes a layered construction that includes an aerogel insulation material 74 having a first surface 76 and a second surface 78 that is oppositely-disposed from the first surface 76. In another non-limiting aspect of the disclosure, the thermal insulation blanket 72 can include a layered construction that includes an aerogel insulation material 74 in combination with a glass fiber material. It will be understood that gaps are shown in the thermal insulation blanket assembly 70 for clarity of the drawing and may or may not be included.

A backing 80 is include in the thermal insulation blanket 72 and covers the second surface 78 of the aerogel insulation material 74. The backing 80 can be any suitable material including, but not limited to, a thin polyimide film. The backing 80 can be selected or configured to provide or enable minimal thickness and weight, as well as manufacturing compatibilities or capabilities, with the aerogel. In a non-limiting aspect, the aerogel insulation material 74 can be layered with other insulation material, including but not limited to at least one of fiberglass or ceramic insulation materials to produce a blanket with enhanced thermal resistance properties. In an additional non-limiting aspect, the aforementioned layering can include interweaving of the other insulation material with the aerogel.

A skin layer 82 is also include in the thermal insulation blanket 72. The skin layer 82 covers the first surface 76 of the aerogel insulation material 74. The skin layer 82 can also wrap around an end 84 (or ends) of the aerogel insulation material 74, a portion of the backing 80, and a portion of the second surface 78 to form an edge closeout. The skin layer 82 can be any suitable material including, but not limited to, a metal skin layer. Such a metal skin layer can include, but is not limited to, a metallic foil. Because the skin layer 82 forms an edge closeout, it will be understood that the aerogel insulation material 74 can be sealed at its edges by the skin layer 82. Among other things, the skin layer 82 forms a thin integral corrosion resistant face sheet to provide arresting capability to meet FAA requirements for nacelle cowl structures.

Adhesive 86 can be located between at least a portion of the skin layer 82, which is folded around the portion of the backing 80 and the backing 80.

To further enhance the low weight characteristics of the thermal insulation blanket 72 an integral fastener 90 can be included in the thermal insulation blanket assembly 70. The fastener 90 can be any suitable fastener including, but not limited to, a molded, polyimide fastener, or a non-metallic material which are also integrated into the thermal insulation blanket 72 and require simple mating features on the cowl structure. In the illustrated example, a head 92 and a screw portion 94 are included in the fastener 90. The head 92 is illustrated as being located between skin layer 82, which is folded around the portion of the backing 80 and the backing 80 within the adhesive 86. In this manner, the head 92 is retained by the skin layer 82. The screw portion 94 projects away from the second surface 78 and is configure to be retained within the mating features on the cowl structure. The thermal insulation blanket 72 can thus be selectively removable from the cowl structure and can easily be replaced if damaged.

Also illustrated in FIG. 3 is an attachment structure 96, which is included in the thermal insulation blanket assembly 70. The attachment structure 96 can be mounted to a cowl of the core engine and configured to operably couple to the fastener 90. It will be understood that the attachment structure 96 can be any suitable structure including, but not limited to, an attachment flange 98 as illustrated, which is attached to the cowl in a core engine of a gas turbine engine. A coupling post 100 is illustrated as being included in the attachment flange 98. The coupling post 100 is configured to retain the screw portion 94 of the fastener 90. By way of non-limiting examples, the attachment flange 98 can be metallic and the coupling post 100 can be a molded polyimide ratchet post.

Figure 4:
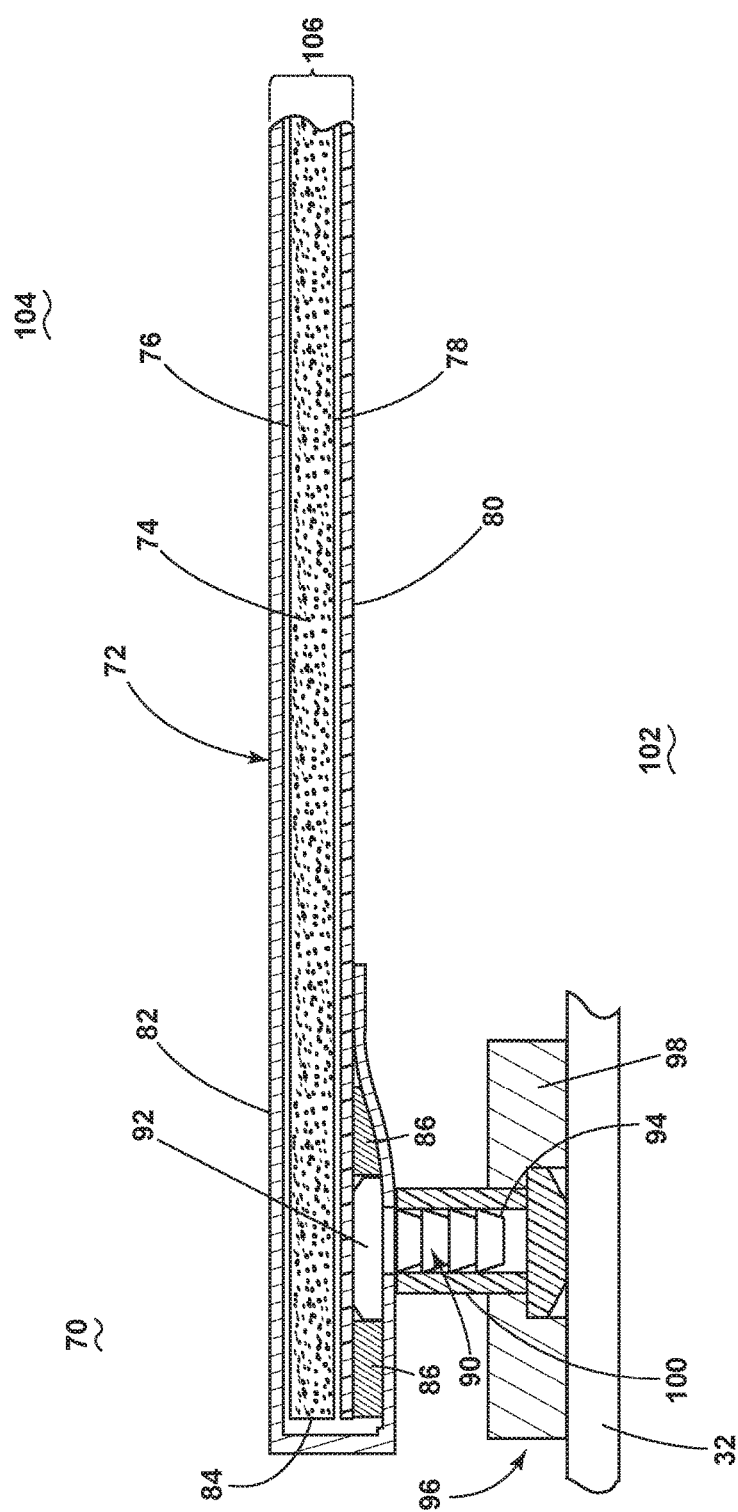
FIG. 4 is a cross-sectional view similar to that of FIG. 3 with the blanket installed with an attachment flange.

FIG. 4 illustrates the thermal insulation blanket 72 installed via the integral fastener 90 and the attachment structure 96. Once installed the thermal insulation blanket 72 thermally protects the cowl that defines a boundary of a bypass duct of the gas turbine engine. The backing 80 forms a cold side barrier, the cold side is indicated as 102, and the skin layer 82 forms a hot side barrier, the hot side is indicated as 104, in the gas turbine engine 10. In combination, the inner core cowl 32 and the thermal insulation blanket assembly 70 can be installed to surround at least the combustor section (corresponding to the combustor 24) and turbine section (corresponding to the high-pressure turbine 26 and low-pressure turbine 28), and the thermal insulation blanket assembly 70 serves to preserve the structural integrity of the inner core cowl 32 by limiting the temperatures to the inner core cowl 32 are subjected during engine operation. Non-limiting example temperatures to the inner core cowl 32 can include elevated temperatures occurring in the event of engine case leakage, duct leakage, and the like.

An insulation blanket assembly as contemplated by the present disclosure, an example of which is shown in FIGS. 3-5 includes a thermal insulation blanket assembly 70 that has a thickness 106 ranging from 1.2 mm (0.05 inches) to 7.5 mm (0.30 inches) with minimal local fastener protrusion. It is contemplated that the thermal insulation blanket 72 can have an overall thickness below that of conventional blankets. Further, the thermal insulation blanket assembly 70 will have an installed weight of approximately 1.953 kilograms per square meter (0.4 pounds per square foot) or less, with commensurate, significant weight savings and resulting fuel and payload improvements. This includes having a small number of conventional fasteners to retain the thermal insulation blanket 72 in position in the event of a catastrophic event. In one non-limiting aspect of the disclosure, the number of conventional fasteners can include a range of between twenty to fifty fasteners. The thermal insulation blanket 72 will also include thermal protective caps for the conventional fastener locations. However, the majority of fasteners will be integral fasteners 90, described above, and which are lightweight and integral to the thermal insulation blanket 72.

The insulation blanker assembly disclosed herein provides multiple benefits, which can positively impact cost and performance. More specifically, aspects of the present disclosure will yield reduced engine installation and therefore aircraft weight that can be utilized as increased payload or increase fuel range or can provide improved specific fuel consumption or performance. The aspects disclosed herein will also allow smaller nacelles, which externally reduces aerodynamic drag and improving specific fuel consumption and performance. Also the blanket can be thinner, lighter, and more efficient because of the utilization of low weight insulation materials, a thin skin, and attachment using molded polyimide snap fasteners that are integral to the blanket. The thinner assembly as described herein can provide more packaging volume for the engine or its associated accessories. Significant cost savings are anticipated from the proposed fastener approach, which has a significantly reduced number of fasteners.

This written description uses examples to disclose the present disclosure, including the best mode, and to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A thermal insulation cover, comprising:
   an aerogel insulation material having a first surface and a second surface that is oppositely-disposed from the first surface;
   a backing covering the second surface of the aerogel insulation material; and a metallic foil skin layer covering the first surface of the aerogel insulation material and wrapping around an end of the aerogel insulation material and a portion of the backing and a portion of the second surface.

2. The thermal insulation cover of claim 1 wherein the backing is a polyimide film.

3. The thermal insulation cover of claim 1, further comprising adhesive located between at least a portion of the skin layer and the backing.

4. The thermal insulation cover of claim 3, further comprising an integral fastener having a head and a screw portion.

5. The thermal insulation cover of claim 4 wherein the head of the integral fastener is located within the adhesive.

6. The thermal insulation cover of claim 5 wherein the screw portion projects through the skin layer.

7. The thermal insulation cover of claim 4 wherein the thermal insulation cover is installed via the integral fastener in a core engine of a gas turbine engine.

8. The thermal insulation cover of claim 7 wherein the thermal insulation cover is installed so as to thermally protect a cowl that defines a boundary of a bypass duct of the gas turbine engine.

9. The thermal insulation cover of claim 7 wherein the backing forms a cold side barrier and the skin layer forms a hot side barrier in the gas turbine engine.

10. The thermal insulation cover of claim 1 wherein the aerogel insulation material is sealed at a set of edges by the skin layer.

11. A thermal insulation blanket assembly covering at least a portion of a core engine of a gas turbine engine, comprising:
a thermal insulation blanket having a layered construction, comprising:
an aerogel insulation material having a first surface and a second surface that is oppositely-disposed from the first surface;
a backing covering the second surface of the aerogel insulation material;
a skin layer covering the first surface of the aerogel insulation material and wrapping around an end of the aerogel insulation material, a portion of the backing, and a portion of the second surface; and
a fastener integrated into the blanket and configured to operably fasten to a cowl of the core engine; and
an attachment structure mounted to a cowl of the core engine, wherein the attachment structure comprises an attachment flange having a coupling post that is configured to retain a portion of the fastener.

12. The thermal insulation blanket assembly of claim 11 wherein the attachment flange is metallic and the coupling post is nylon.

13. The thermal insulation blanket assembly of claim 11 wherein the fastener comprises a head retained by the skin layer and a screw portion that projects away from the second surface and is configure to be retained within the coupling post.

14. The thermal insulation blanket assembly of claim 11 wherein the skin layer is a metallic foil that is configured to seal edges of the aerogel insulation material.

15. The thermal insulation blanket assembly of claim 11 wherein the backing is a polyimide film.

16. A thermal insulation blanket assembly for a gas turbine engine, comprising:
a thermal insulation blanket, comprising:
an aerogel insulation material having oppositely-disposed first and second surfaces;
a metal skin layer covering the first surface of the aerogel insulation material and wrapping around an end to cover an edge of the second surface; and
an integrated fastener configured to mate with a structure on a cowl of the gas turbine engine; and
wherein the thermal insulation blanket has a thickness ranging from 1.2 mm to 7.5 mm.

17. The thermal insulation blanket assembly of claim 16, further comprising at least one of a glass fiber insulation material or a ceramic insulation material.

18. The thermal insulation blanket assembly of claim 16 wherein the thermal insulation blanket assembly will have an installed weight of approximately 1.953 kilograms per square meter or less.

* * * * *